United States Patent
Chan et al.

(10) Patent No.: US 11,782,872 B2
(45) Date of Patent: Oct. 10, 2023

(54) DISTRIBUTION OF OVER-CONFIGURED LOGICAL PROCESSORS

(71) Applicant: International Business Machines Corporation, Armonk, NY (US)

(72) Inventors: Jeffrey G. Chan, Fishkill, NY (US); Seth E. Lederer, Staatsburg, NY (US); Jerry A. Moody, LaGrangeville, NY (US); Hunter J. Kauffman, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/653,798

(22) Filed: Mar. 7, 2022

(65) Prior Publication Data

US 2023/0281158 A1    Sep. 7, 2023

(51) Int. Cl.
*G06F 15/82* (2006.01)
*G06F 13/36* (2006.01)

(52) U.S. Cl.
CPC .............. *G06F 15/82* (2013.01); *G06F 13/36* (2013.01)

(58) Field of Classification Search
None
See application file for complete search history.

(56) References Cited

U.S. PATENT DOCUMENTS

| | | |
|---|---|---|
| 10,013,264 B2 | 7/2018 | Jacobs et al. |
| 10,061,623 B2 | 8/2018 | Farrell et al. |
| 10,372,505 B2 | 8/2019 | Farrell et al. |
| 10,768,936 B2 | 9/2020 | Burger et al. |
| 2008/0163203 A1* | 7/2008 | Anand .................. G06F 9/5077 718/1 |
| 2010/0223622 A1* | 9/2010 | Anand .................. G06F 9/5077 718/105 |
| 2011/0145505 A1 | 6/2011 | Anand et al. |
| 2014/0173597 A1* | 6/2014 | Anand .................. G06F 9/5038 718/1 |
| 2014/0189704 A1 | 7/2014 | Narvaez et al. |
| 2014/0281346 A1* | 9/2014 | Nayar ................. G06F 9/45558 711/173 |

(Continued)

FOREIGN PATENT DOCUMENTS

CN    108027807 A    5/2018

OTHER PUBLICATIONS

Autosar, "Guide to Multi-Core Systems," V1.1.0, R4.1, Rev 3, copyright 2022, 28 pages. https://www.autosar.org/fileadmin/user_upload/standards/classic/4-1/AUTOSAR_EXP_MultiCoreGuide.pdf.

(Continued)

*Primary Examiner* — Eric Coleman
(74) *Attorney, Agent, or Firm* — Yee & Associates, P. C.

(57) ABSTRACT

Logical processor distribution across physical processors is provided. A set of logical processors of a number of logical processors defined for a particular logical partition of a plurality of active logical partitions is assigned to a physical processor chip having a greatest logical processor entitlement for the particular logical partition until no more logical processors can be assigned to that physical processor chip based on a logical processor entitlement of that physical processor chip being exhausted. Remaining logical processors of the number of logical processors defined for the particular logical partition are assigned to other physical processor chips of a plurality of physical processor chips assigned to the particular logical partition until all of the remaining logical processors have been assigned to a physical processor chip.

20 Claims, 4 Drawing Sheets

(56) References Cited

U.S. PATENT DOCUMENTS

| | | | | |
|---|---|---|---|---|
| 2014/0281347 A1* | 9/2014 | Nayar | ............ | G06F 11/2028 |
| | | | | 711/173 |
| 2014/0281348 A1* | 9/2014 | Nayar | ............ | G06F 12/02 |
| | | | | 711/173 |
| 2014/0282530 A1* | 9/2014 | Aslot | ............ | G06F 9/45558 |
| | | | | 718/1 |
| 2018/0074974 A1* | 3/2018 | Borlick | ............ | G06F 9/5083 |
| 2018/0143863 A1 | 5/2018 | Arora et al. | | |
| 2020/0401435 A1 | 12/2020 | Somasundaram et al. | | |
| 2021/0160100 A1* | 5/2021 | Steinmacher-Burow | ............ | |
| | | | | H04L 12/4641 |

OTHER PUBLICATIONS

Behbahani et al., Multi-Core Processors: An Enabling Technology for Embedded Distributed Model-Based Control (Postprint), American Institute of Aeronautics and Astronautics, Jul. 2008, 14 pages.

Anonymous, "Method and mechanism to use prioritized classes as an optimization for shared processor partitioning resource usage," An IP.com Prior Art Database Technical Disclosure, IPCOM000181074D, Mar. 25, 2009, 3 pages.

Anonymous, "Using Availability of Unentitled Power to Influence Processor Population," An IP.com Prior Art Database Technical Disclosure, IPCOM000225280D, Feb. 5, 2013, 5 pages.

Anonymous, "Algorithm for Detecting CPU Contention in Virtual Servers on Pools of Shared Processors," An IP.com Prior Art Database Technical Disclosure, IPCOM000257257D, Jan. 25, 2019, 5 pages.

Wang et al., SWAP: Effective Fine-Grain Management of Shared Last-Level Caches with Minimum Hardware Support, 2017 IEEE International Symposium on High Performance Computer Architecture (HPCA), Feb. 2017, 12 pages.

PCT International Search Report and Written Opinion, dated May 31, 2023, regarding Application No. PCT/CN2023/079791, 8 pages.

* cited by examiner

DISTRIBUTION OF OVER-CONFIGURED LOGICAL PROCESSORS

BACKGROUND

1. Field

The disclosure relates generally to logical partitions and more specifically to distribution of over-configured logical processors across physical processor chips assigned to a logical partition of a computer based on the highest logical processor entitlement for the given logical partition.

2. Description of the Related Art

A logical partition is a subset of a computer's hardware resources, virtualized as a separate computer. In effect, a physical computer can be partitioned into multiple logical partitions, each logical partition hosting a separate instance of an operating system.

Although each logical partition acts as an independent computer, the logical partitions on the physical computer can share different types of resources with each other. The ability to share resources among logical partitions allows increased resource utilization on the physical computer and moves the computer resources to where they are needed.

For example, logical partitions can share processors, memory, input/output (I/O) interfaces, and the like. Logical partitions enable sharing of processors in shared processor pools. Each logical partition that uses shared processors is assigned a specific amount of processor power from its shared processor pool. By default, each logical partition is set so that the logical partition uses no more than its assigned processor power. Optionally, a logical partition can be set so that the logical partition can use processor power that is not being used by other logical partitions in its shared processor pool. If a logical partition is set so that it can use unused processor power of other logical partitions, the amount of processor power that the logical partition can use is limited by the virtual processor settings of the logical partition and by the amount of unused processor power available in the shared processor pool that is used by the logical partition.

Logical partitions also enable sharing of memory in a shared memory pool. Instead of assigning a dedicated amount of physical memory to each logical partition that uses shared memory, a partition manager (e.g., a hypervisor) provides the physical memory from the shared memory pool to shared memory partitions as needed. The partition manager provides portions of the shared memory pool that are not currently being used by shared memory partitions to other shared memory partitions that need to use the memory.

Logical partitions can also allow sharing of I/O interface resources on other logical partitions. For example, a virtual LAN can connect the logical partitions on the physical computer to each other. If one of the logical partitions on the computer has a physical Ethernet adapter that is connected to an external network, the operating system of that logical partition can be configured to connect the virtual LAN with the physical Ethernet adapter. This allows the logical partitions on the server to share a physical Ethernet connection to an external network.

SUMMARY

According to one illustrative embodiment, a computer-implemented method for logical processor distribution across physical processors is provided. A computer assigns a set of logical processors of a number of logical processors defined for a particular logical partition of a plurality of active logical partitions to a physical processor chip having a greatest logical processor entitlement for the particular logical partition until no more logical processors can be assigned to that physical processor chip based on a logical processor entitlement of that physical processor chip being exhausted. The computer assigns remaining logical processors of the number of logical processors defined for the particular logical partition to other physical processor chips of a plurality of physical processor chips assigned to the particular logical partition until the remaining logical processors have been assigned to a physical processor chip. According to other illustrative embodiments, a computer system and computer program product for logical processor distribution across physical processors are provided.

DETAILED DESCRIPTION

Figure 1:
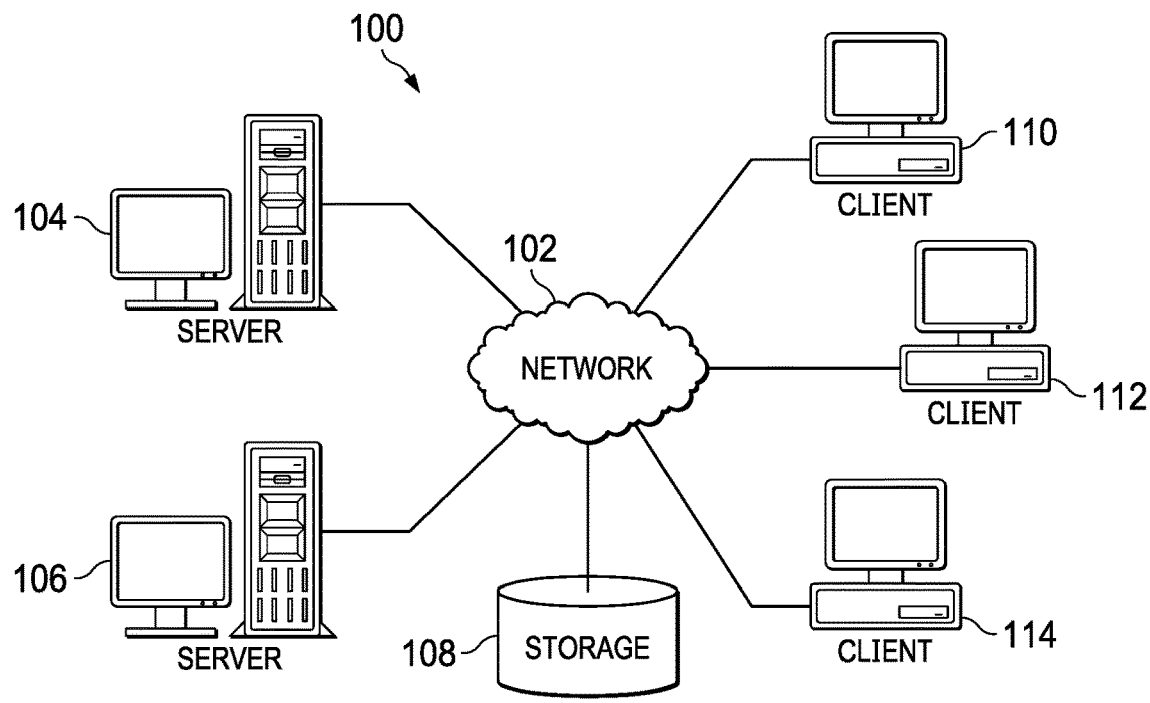
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
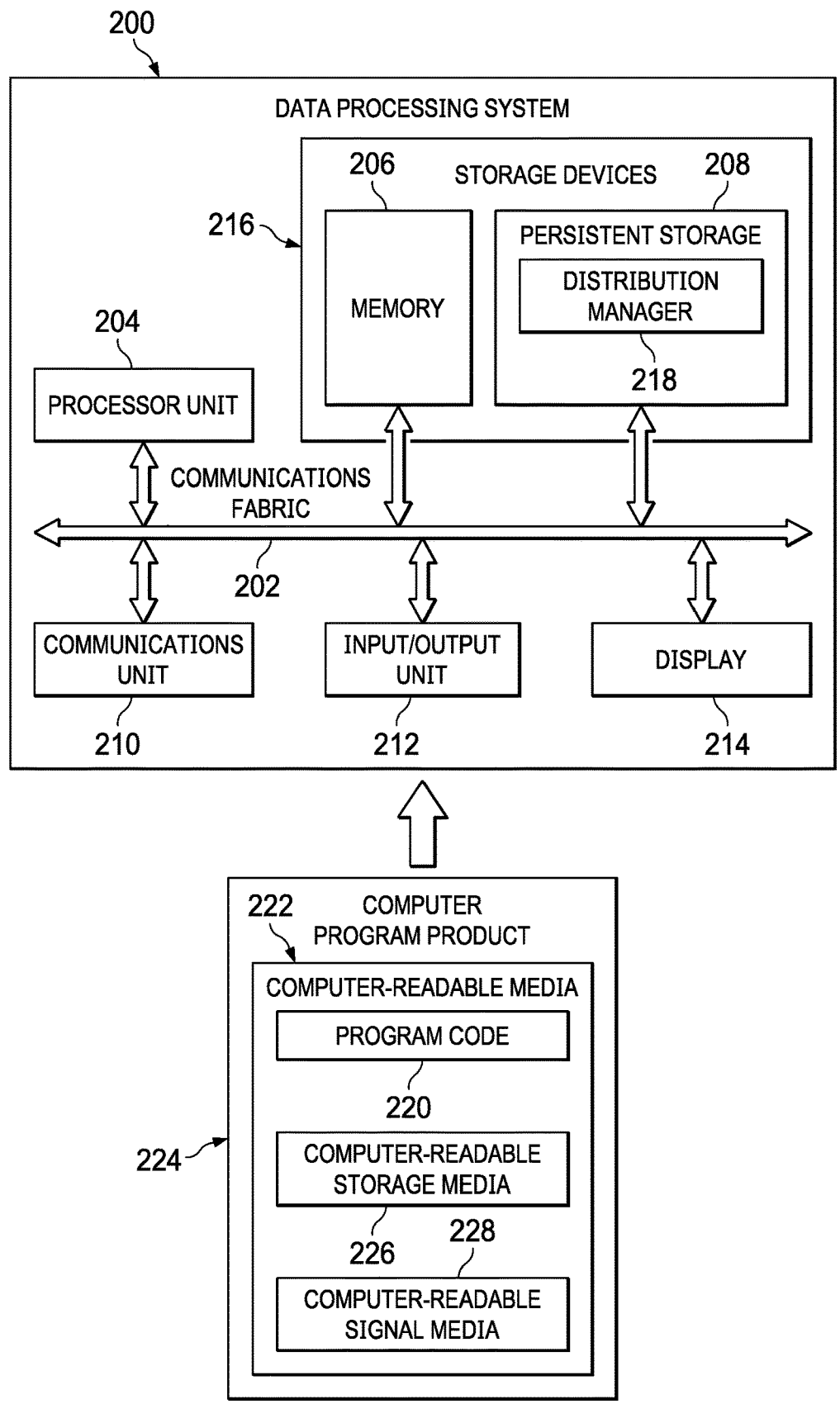
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, mainframe server computers with high-speed connections to network 102. Also, server 104 and server 106 may each represent a cluster of mainframe servers in one or more data centers. Alternatively, server 104 and server 106 may each represent multiple mainframe computing nodes in one or more cloud environments.

In addition, server 104 and server 106 provide a set of services, such as, for example, financial services, banking services, governmental services, educational services, event monitoring services, data services, or the like, to client devices by executing workloads or tasks associated with the services. The services may correspond to one or more entities, such as, for example, an enterprise, company, business, organization, institution, agency, or the like.

Server 104 and server 106 are over-configured with logical processors across physical processor chips assigned to logical partitions of server 104 or server 106. Each server computer has as set of physical resources (e.g., processors, memory, and I/O interfaces, and the like). This set of physical resources is known as a physical configuration of the server. From a perspective of a partition manager (e.g., hypervisor), each logical partition has a set of resource requirements (e.g., processor, memory, and I/O interface requirements). This set of resource requirements is known as a logical configuration of a logical partition. The logical configuration can be, and typically is, different for each logical partition of the server.

Placement of a logical partition (i.e., mapping the logical configuration of a logical partition to the physical configuration of the server) plays a role in performance of the logical partition as placement of the logical partition affects cache access, memory access, and overall server throughput and performance. Specifically, when multiple shared logical partitions are over-configured, balancing the distribution of shared logical processors while having the least impact on other running logical partitions is a performance concern.

When shared logical partitions are over-configured with logical processors, the surplus logical processors beyond the logical partition entitlement must be spread on the server to adhere to the architectural rule that a logical processor must have a backing physical processor. To support multiple over-configured shared logical partitions, illustrative embodiments balance the surplus logical processors, on a logical partition basis, starting with the physical processor chip of the computer having the greatest or highest logical processor entitlement for that particular logical partition. Illustrative embodiments then proceed to distribute remaining shared logical processors to other physical processor chips assigned to that particular logical partition in a sequential manner as needed. This ensures that if these over-configured logical partitions require additional server resources, the dispatcher can dispatch logical processors to their assigned physical processor chip with less contention because illustrative embodiments have already balanced the surplus logical processors across the server.

Client 110, client 112, and client 114 also connect to network 102. Clients 110, 112, and 114 are client devices of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart glasses, smart televisions, smart vehicles, smart appliances, virtual reality devices, gaming devices, kiosks, and the like, with wire or wireless communication links to network 102. Users of clients 110, 112, and 114 may utilize clients 110, 112, and 114 to access and utilize the services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of servers, identifiers for server drawers, identifiers for server nodes, identifiers for server chips, identifiers for server partitions, logical processor entitlements for respective partitions, and the like. Furthermore, storage 108 may store other types of data, such as authentication or credential data that may include usernames, passwords, and the like associated with, for example, system administrators or the like.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the over-configured logical processor distribution processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 represents a plurality of physical processor chips, each physical processor chip is comprised of a plurality of physical processor cores. The plurality of physical processor chips may include homogeneous processor chips or heterogeneous processor chips.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a set of random-access memory, or any other suitable volatile or non-volatile storage devices. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores distribution manager 218. However, it should be noted that even though distribution manager 218 is illustrated as residing in persistent storage 208, in an alternative illustrative embodiment, distribution manager 218 may be a separate component of data processing system 200. For example, distribution manager 218 may be a hardware component coupled to communication fabric 202 or a combination of hardware and software components. In another alternative illustrative embodiment, distribution manager 218 may be located in a controller or management server, such as, for example, server 106 in FIG. 1, that manages a plurality of other servers in its cluster.

Distribution manager 218 controls the process of distributing over-configured logical processors across the plurality of physical processor chips of processor unit 204 that are assigned to a logical partition of data processing system 200. It should be noted that data processing system 200 may include a plurality of logical partitions (e.g., up to 80 or more logical partitions). Distribution manager 218 performs this logical processor distribution process for each respective logical partition of data processing system 200. First, distribution manager 218 assigns logical processors to a physical processor chip having the greatest logical processor entitlement until no more logical processors can be assigned to that particular physical processor chip. In other words, that particular physical processor chip has exhausted its logical processor entitlement (i.e., another logical processor cannot be assigned to that particular physical processor chip). Second, distribution manager 218 assigns any remaining logical processors defined for the logical partition to other physical processor chips assigned to that particular logical partition until all of the remaining logical processors have been assigned to a physical processor chip. It should be noted that distribution manager 218 assigns the remaining logical processors sequentially to the right to higher numbered physical processor chips and then wrapping around to lower numbered physical processor chips using a novel logical processor distribution process of illustrative embodiments.

As a result, data processing system 200 operates as a special purpose computer system in which distribution manager 218 in data processing system 200 enables balanced distribution of over-configured logical processors in logical partitions to physical processor chips to improve performance of data processing system 200. In particular, distribution manager 218 transforms data processing system 200 into a special purpose computer system as compared to currently available general computer systems that do not have distribution manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity, Bluetooth® technology, global system for mobile communications, code division multiple access, second-generation, third-generation, fourth-generation, fourth-generation Long Term Evolution, Long Term Evolution Advanced, fifth-generation, or any other wireless communication technology or standard to establish a wireless communications link for data processing system 200. Bluetooth is a registered trademark of Bluetooth Sig, Inc., Kirkland, Wash.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

HiperDispatch is a workload dispatching feature of an operating system. HiperDispatch aligns workloads to a decreased number of processors to maximize the benefits of the processor cache structures. As a result, HiperDispatch reduces the amount of processor time needed to execute workloads associated with services hosted by the server.

Without HiperDispatch, a unit of work may be dispatched on any logical processor of the workload type needed. A unit of work starts on one logical processor and subsequently may be dispatched on any other logical processor. The logical processors for one logical partition will receive an equal share for equal access to the physical processors. For example, if the weight of a logical partition with four logical processors results in a share of two physical processors, or 200%, the partition manager will manage each of the four logical processors with a 50% share of a physical processor. All logical processors will be used if there is work available, and they typically have similar processing utilizations.

With HiperDispatch, a workload can be managed across fewer logical processors. In the example above (i.e., without HiperDispatch), having a logical partition with a 200% processor share and four logical processors, two logical processors are sufficient to obtain the two physical processors worth of capacity specified by the partition weight. The other two logical processors allow the partition to access capacity available from other partitions with insufficient workload to consume their share. The operating system limits the number of active logical processors to the number needed based on partition weight, workload demand, and available capacity. The operating system also takes into account the processor topology when dispatching work, and works to build a strong affinity between logical processors and physical processors in the processor configuration.

The logical processors, which correspond to a logical partition having the HiperDispatch mode set to YES, fall into one of a vertical high logical processor category, a vertical medium logical processor category, or a vertical low logical processor category. For example, some logical processors for a partition receive a 100% processor share, meaning this vertical high logical processor receives a logical partition target for 100% share of a physical processor. This is viewed as having a high processor share. Typically, if a partition is large enough, most of the logical partition's share will be allocated among the vertical high logical processors with a 100% share.

Other logical processors may have a medium amount of physical processor share. These vertical medium logical processors would have a processor share greater than 0% but less than 100%. These medium vertical logical processors have the remainder of the logical partition's shares after allocation of the vertical high logical processors with the high share. The logical partition reserves at least a 50% physical processor share for the vertical medium logical processor assignments, assuming the logical partition is entitled to at least that amount of service.

Some logical processors may have 0% of physical processor share. These discretionary or low vertical logical processors are not needed to allow the partition to consume the physical processor resource associated with its weight. These vertical low logical processors may be parked. In a parked state, these vertical low logical processors do not dispatch work. These vertical low logical processors are parked when they are not needed to handle the partition's workload (e.g., not enough workload) or are not useful because physical capacity does not exist (e.g., no time available from other logical partitions).

When a partition wants to consume more processor than is guaranteed by its share and other partitions are not consuming their full guaranteed share, a parked vertical low logical processor can be unparked to start dispatching additional workload into the available processor cycles not being used by other partitions. An unparked vertical low logical processor may assist work running on the same processor type.

Illustrative embodiments define multiple shared logical partitions when a HiperDispatch mode is set to YES for a logical partition or when the HiperDispatch mode is set to NO for a logical partition, where the shared logical processor entitlement of logical partitions is over-configured. For example, for HiperDispatch mode set to NO for a logical partition, if the logical partition is only entitled to 5 physical processor chips but the logical partition has 50 logical processors defined (i.e., over-configured), each logical processor only receives 10% of a physical processor chip based on the logical partition weight.

Given that multiple over-configured logical partitions exist on the server, illustrative embodiments make changes to the distribution algorithm for shared logical processors based on whether the HiperDispatch mode is set to YES or NO. The novel logical processor distribution process of illustrative embodiments depends on the physical processor chip having the greatest logical processor entitlement for that logical partition. That physical processor chip having the greatest logical processor entitlement is the starting point for where the distribution manager of illustrative embodiments maps and assigns the over-configured shared logical processors to the physical configuration. Illustrative embodiments then continue to place any remaining logical processors sequentially to the right to higher numbered physical processor chips, wrapping back around to the lowest numbered physical processor chip once the higher processor chips have been exhausted (i.e., when the logical processor entitlement is filled, and no more logical processors can be assigned to a particular physical processor chip). With multiple over-configured logical partitions, this exhaustion of physical processor chips ensures that the shared logical processors are balanced across the server.

Thus, illustrative embodiments provide one or more technical solutions that overcome a technical problem with over-configured logical partitions in a server. As a result, these one or more technical solutions provide a technical effect and practical application in the field of mainframe servers.

Figure 3:
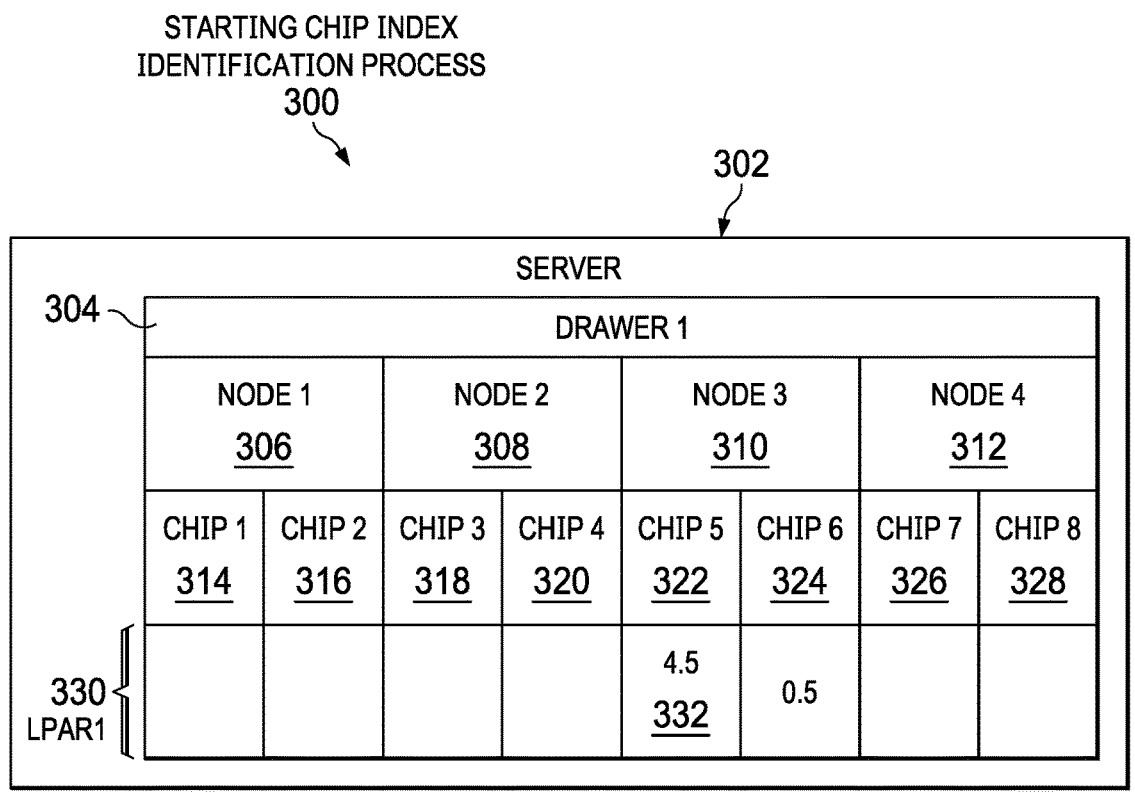
FIG. 3 is a diagram illustrating an example of a starting chip index identification process in accordance with an illustrative embodiment.

With reference now to FIG. 3, a diagram illustrating an example of a starting chip index identification process is depicted in accordance with an illustrative embodiment. Starting chip index identification process 300 is implemented in server 302, such as, for example, server 104 in FIG. 1 or data processing system 200 in FIG. 2.

In this example, server 302 includes drawer 1 304. It should be noted that even though only one drawer is shown in this example, server 302 may include any number of drawers. A drawer is a processor container that includes logical processor entitlement and memory for each logical partition. Also in this example, drawer 1 304 includes node 1 306, node 2 308, node 3 310, and node 4 312. However, it should be noted that alternative illustrative embodiments may include any number of nodes in a drawer.

Further in this example, node 1 306 includes chip 1 314 and chip 2 316; node 2 308 includes chip 3 318 and chip 4 320; node 3 310 includes chip 5 322 and chip 6 324; and node 4 312 includes chip 7 326 and chip 8 328. However, it should be noted that even though each node is shown as including two chips in this example, in alternative illustrative embodiments each node may include any number of chips. In addition, each of chip 1 314, chip 2 316, chip 3 318, chip 4 320, chip 5 322, chip 6 324, chip 7 326, and chip 8 328 represents a physical processor chip comprised of a plurality of processor cores. Also, chip 1 314, chip 2 316, chip 3 318, chip 4 320, chip 5 322, chip 6 324, chip 7 326, and chip 8 328 comprise a processor unit, such as, for example, processor unit 204 in FIG. 2. Furthermore in this example, the distribution manager of illustrative embodiments (e.g., distribution manager 218 in FIG. 2) assigns the logical processor entitlement of logical partition 1 (LPAR1) 330 to chip 5 322 and chip 6 324. Moreover, it should be noted that server 302 may include any number of logical partitions and that any number of physical processor chips may be assigned to each logical partition.

When assigning logical processors to physical processor chips with the HiperDispatch mode set to NO, starting chip index 332 indicates the physical processor chip having the greatest logical processor entitlement. Numbers in the row associated with LPAR1 330 indicate the logical processor entitlement that corresponds to a given physical processor chip for that particular partition.

In this example, starting chip index 332 corresponds to chip 5 322 of node 3 310 because chip 5 322 has the greatest logical processor entitlement (i.e., 4.5 logical processors) for LPAR1 330. Chip 6 324 has a logical processor entitlement of 0.5. The distribution manager of illustrative embodiments first assigns logical processors to chip 5 322 until its logical processor entitlement (4.5) is exhausted. The distribution manager of illustrative embodiments then proceeds to search remaining physical processor chips in the following order to assign remaining logical processors sequentially to the right: node 3 310, chip 6 324; node 4 312, chip 7 326; node 4 312, chip 8 328; and then wrapping back around to node 1 306, chip 1 314; node 1, chip 2 316; node 2 308, chip 3 318; and node 2 308, chip 4 320.

The distribution manager of illustrative embodiments repeats this novel logical processor distribution process for each active logical partition in server 302. Because the logical partition entitlement is available in limited quantities on each physical processor chip, the distribution manager of illustrative embodiments ensures that logical partitions in server 302 have a different starting chip index or that all the logical partitions in server 302 cannot have the same starting chip index, which leads to a more balanced distribution of logical processors of multiple over-configured logical partitions.

Figure 4:
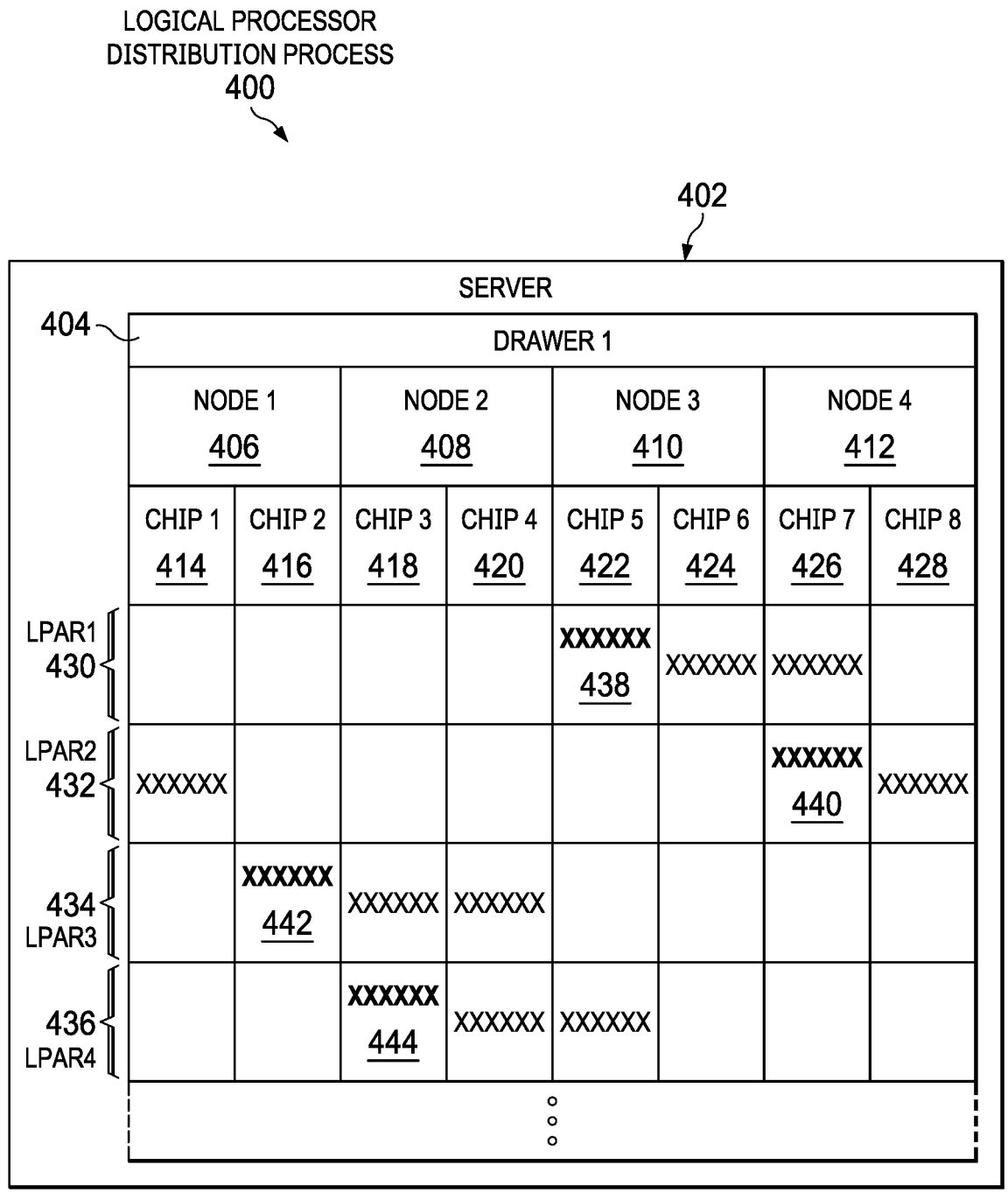
FIG. 4 is a diagram illustrating an example of a logical processor distribution process in accordance with an illustrative embodiment.

With reference now to FIG. 4, a diagram illustrating an example of a logical processor distribution process is depicted in accordance with an illustrative embodiment. Logical processor distribution process 400 is implemented in server 402, such as, for example, server 104 in FIG. 1, data processing system 200 in FIG. 2, or server 302 in FIG. 3.

In this example, server 402 includes drawer 1 404, such as, for example, drawer 1 304 in FIG. 3. Drawer 1 404 includes node 1 406, node 2 408, node 3 410, and node 4 412, such as, for example, node 1 306, node 2 308, node 3 310, and node 4 312 in FIG. 3. Node 1 406 includes chip 1 414 and chip 2 416, such as, for example, chip 1 314 and chip 2 316 in FIG. 3. Node 2 408 includes chip 3 418 and chip 4 420, such as, for example, chip 3 318 and chip 4 320 in FIG. 3. Node 3 410 includes chip 5 422 and chip 6 424, such as, for example, chip 5 322 and chip 6 324 in FIG. 3. Node 4 412 includes chip 7 426 and chip 8 428, such as, for example, chip 7 326 and chip 8 328 in FIG. 3. Further, the distribution manager of illustrative embodiments (e.g., distribution manager 218 in FIG. 2) assigns the logical processor entitlement of LPAR1 430 to chip 5 422, chip 6 424, and chip 7 426. Similarly, the distribution manager of illustrative embodiments assigns the logical processor entitlement of LPAR2 432 to chip 1 414, chip 7 426, and chip 8 428; the logical processor entitlement of LPAR3 434 to chip 2 416, chip 3 418, and chip 4 420; and the logical processor entitlement of LPAR4 436 to chip 3 418, chip 4 420, and chip 5 422.

In this example, multiple over-configured logical partitions are shown with HiperDispatch set to NO, where each respective partition in the set of logical partitions is entitled to only 5 physical processor chips. Each row of the table represents a logical partition (i.e., LPAR1 430, LPAR2 432, LPAR3 434, and LPAR4 436) and each "x" represents a logical processor in a corresponding logical partition. A physical processor chip having bolded x's in a given row represents the physical processor chip with the highest logical processor entitlement (i.e., the starting chip index for logical processor distribution) for that particular logical partition. For example, starting chip index 438 corresponding to chip 5 422 of node 3 410 indicates that chip 5 422 has the greatest logical processor entitlement for LPAR1 430 and is the starting point for over-configured logical processor distribution in LPAR1 430. Similarly, starting chip index 440 corresponding to chip 7 426 of node 4 412 indicates that chip 7 426 has the greatest logical processor entitlement for LPAR2 432 and is the starting point for over-configured logical processor distribution in LPAR2 432; starting chip index 442 corresponding to chip 2 416 of node 1 406 indicates that chip 2 416 has the greatest logical processor entitlement for LPAR3 434 and is the starting point for over-configured logical processor distribution in LPAR3 434; and starting chip index 444 corresponding to chip 3 418 of node 2 408 indicates that chip 3 418 has the greatest logical processor entitlement for LPAR4 436 and is the starting point for over-configured logical processor distribution in LPAR4 436.

Figure 5:
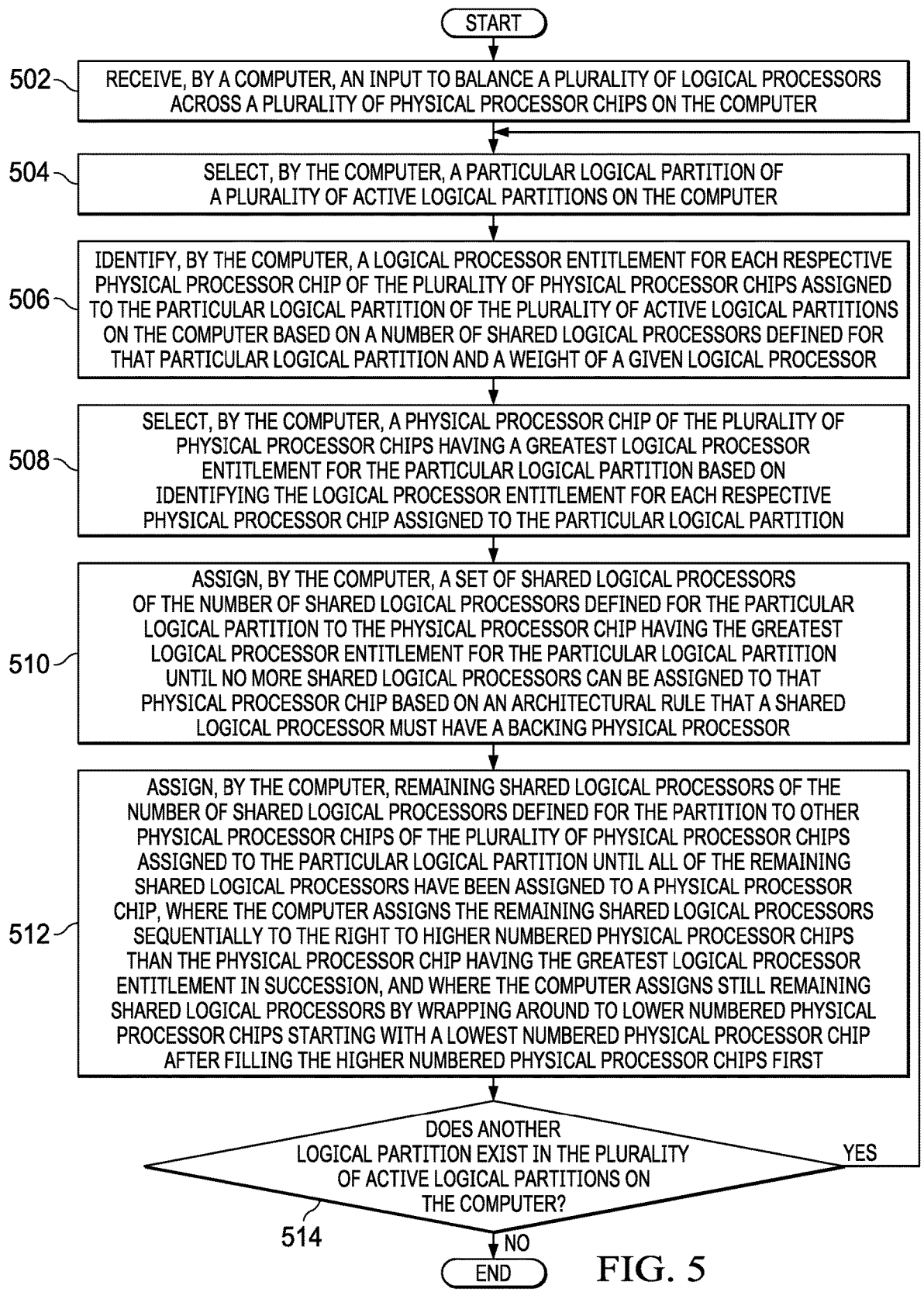
FIG. 5 is a flowchart illustrating a process for balancing shared logical processors across physical processor chips of a computer having multiple over-configured logical partitions in accordance with an illustrative embodiment.

With reference now to FIG. 5, a flowchart illustrating a process for balancing shared logical processors across physical processor chips of a computer having multiple over-configured logical partitions is shown in accordance with an illustrative embodiment. The process shown in FIG. 5 may be implemented in a computer, such as, for example, server 104 in FIG. 1, data processing system 200 in FIG. 2, server 302 in FIG. 3, or server 402 in FIG. 4. For example, the process shown in FIG. 5 may be implemented in a distribution manager, such as distribution manager 218 in FIG. 2.

The process begins when the computer receives an input to balance a plurality of logical processors across a plurality of physical processor chips on the computer (step 502). The computer may receive the input automatically on a defined time interval basis or may receive the input on demand. In response to the computer receiving the input, the computer selects a particular logical partition of a plurality of active logical partitions on the computer (step 504). In addition, the computer identifies a logical processor entitlement for each respective physical processor chip of the plurality of physical processor chips assigned to the particular logical partition of the plurality of active logical partitions on the computer based on a number of shared logical processors defined for that particular logical partition and a weight of a given logical processor (step 506).

The computer selects a physical processor chip of the plurality of physical processor chips having a greatest logical processor entitlement for the particular logical partition based on identifying the logical processor entitlement for each respective physical processor chip assigned to the particular logical partition (step 508). Further, the computer assigns a set of shared logical processors of the number of shared logical processors defined for the particular logical partition to the physical processor chip having the greatest logical processor entitlement for the particular logical partition until no more shared logical processors can be assigned to that physical processor chip based on an architectural rule that a shared logical processor must have a backing physical processor and a logical processor entitlement of that physical processor chip is exhausted (step 510). Furthermore, the computer assigns remaining shared logical processors of the number of shared logical processors defined for the particular logical partition to other physical processor chips of the plurality of physical processor chips assigned to the particular logical partition until all of the remaining shared logical processors have been assigned to a physical processor chip (step 512). The computer assigns the remaining shared logical processors sequentially to the right to higher numbered physical processor chips than the physical processor chip having the greatest logical processor entitlement in succession. The computer assigns still remaining shared logical processors by wrapping around to lower numbered physical processor chips starting with a lowest numbered physical processor chip after filling the higher numbered physical processor chips first.

Afterward, the computer makes a determination as to whether another logical partition exists in the plurality of active logical partitions on the computer (step 514). If the computer determines that another logical partition does exist in the plurality of active logical partitions on the computer, YES output of step 514, then the process returns to step 504 where the computer selects another logical partition from the plurality of active logical partitions on the computer. If the computer determines that another logical partition does not exist in the plurality of active logical partitions on the computer, NO output of step 514, then the process terminates thereafter.

Thus, illustrative embodiments of the present invention provide a computer-implemented method, computer system, and computer program product for distribution of over-configured logical processors across physical processor chips assigned to a logical partition of a computer based on preferred dispatching location. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for logical processor distribution across physical processors, the computer-implemented method comprising:
distributing, by a computer, logical processors across a plurality of physical processor chips assigned to a logical partition of a data processing system, wherein the distributing comprises:
assigning, by a computer, a set of logical processors of a number of logical processors defined for a particular logical partition of a plurality of active logical partitions to a physical processor chip of the plurality of physical processor chips having a greatest logical processor entitlement for the particular logical partition until no more logical processors can be assigned to that physical processor chip based on a logical processor entitlement of that physical processor chip being exhausted; and
assigning, by the computer, remaining logical processors of the number of logical processors defined for the particular logical partition to other physical processor chips of the plurality of physical processor chips assigned to the particular logical partition until the remaining logical processors have been assigned to the other physical processor chips.

2. The computer-implemented method of claim 1, wherein the computer assigns the remaining logical processors sequentially to the right to higher numbered physical processor chips than the physical processor chip having the greatest logical processor entitlement.

3. The computer-implemented method of claim 2, wherein the computer assigns still remaining logical processors by wrapping around to lower numbered physical processor chips starting with a lowest numbered physical processor chip after filling the higher numbered physical processor chips.

4. The computer-implemented method of claim 1 further comprising:
repeating, by the computer, steps of the assigning for each remaining logical partition of the plurality of active logical partitions; and
dispatching, by the computer, a unit of work to the physical processor chip.

5. The computer-implemented method of claim 1 further comprising:
receiving, by the computer, an input to balance a plurality of logical processors across the plurality of physical processor chips;
selecting, by the computer, the particular logical partition of the plurality of active logical partitions on the computer in response to receiving the input and
executing, by the particular logical partition, a workload associated with a service provided by the data processing system.

6. The computer-implemented method of claim 1 further comprising:
identifying, by the computer, a particular logical processor entitlement for each respective physical processor chip of the plurality of physical processor chips assigned to the particular logical partition of the plurality of active logical partitions based on the number of logical processors defined for that particular logical partition and a weight of a given logical processor; and
selecting, by the computer, the physical processor chip of the plurality of physical processor chips having the greatest logical processor entitlement for the particular logical partition based on identifying the particular logical processor entitlement for each respective physical processor chip assigned to the particular logical partition.

7. The computer-implemented method of claim 1, wherein each respective logical partition of the plurality of active logical partitions has a different starting chip index to balance distribution of logical processors of multiple over-configured logical partitions.

8. A computer system for logical processor distribution across physical processors, the computer system comprising:
a bus system;
a storage device connected to the bus system, wherein the storage device stores program instructions; and
a processor connected to the bus system, wherein the processor executes the program instructions to:
distribute logical processors across a plurality of physical processor chips assigned to a logical partition of a data processing system, wherein the program instructions to distribute comprises program instructions to:
assign a set of logical processors of a number of logical processors defined for a particular logical partition of a plurality of active logical partitions to a physical processor chip of the plurality of physical processor chips having a greatest logical processor entitlement for the particular logical partition until no more logical processors can be assigned to that physical processor chip based on a logical processor entitlement of that physical processor chip being exhausted; and
assign remaining logical processors of the number of logical processors defined for the particular logical partition to other physical processor chips of the plurality of physical processor chips assigned to the particular logical partition until the remaining logical processors have been assigned to the other physical processor chips.

9. The computer system of claim 8, wherein the remaining logical processors are assigned sequentially to the right to higher numbered physical processor chips than the physical processor chip having the greatest logical processor entitlement.

10. The computer system of claim 9, wherein still remaining logical processors are assigned by wrapping around to lower numbered physical processor chips starting with a lowest numbered physical processor chip after filling the higher numbered physical processor chips.

11. The computer system of claim 8, wherein the processor further executes the program instructions to:
repeat steps of assigning for each remaining logical partition of the plurality of active logical partitions; and
dispatch a unit of work to the physical processor chip.

12. The computer system of claim 8, wherein the processor further executes the program instructions to:
receive an input to balance a plurality of logical processors across the plurality of physical processor chips;
select the particular logical partition of the plurality of active logical partitions in response to receiving the input and
execute a workload associated with a service provided by the data processing system.

13. The computer system of claim 8, wherein the processor further executes the program instructions to:
identify a particular logical processor entitlement for each respective physical processor chip of the plurality of physical processor chips assigned to the particular logical partition of the plurality of active logical partitions based on the number of logical processors defined for that particular logical partition and a weight of a given logical processor; and
select the physical processor chip of the plurality of physical processor chips having the greatest logical processor entitlement for the particular logical partition based on identifying the particular logical processor entitlement for each respective physical processor chip assigned to the particular logical partition.

14. A computer program product for logical processor distribution across physical processors, the computer program product comprising a non-transitor computer-readable storage medium having program instructions embodied therewith, the program instructions executable by a computer to cause the computer to perform a method of:
distributing, by a computer, logical processors across a plurality of physical processor chips assigned to a logical partition of a data processing system, wherein the distributing comprises:
assigning, by the computer, a set of logical processors of a number of logical processors defined for a particular logical partition of a plurality of active logical partitions to a physical processor chip of the plurality of physical processor chips having a greatest logical processor entitlement for the particular logical partition until no more logical processors can be assigned to that physical processor chip based on a logical processor entitlement of that physical processor chip being exhausted; and assigning, by the computer, remaining logical processors of the number of logical processors defined for the particular logical partition to other physical processor chips of the plurality of physical processor chips assigned to the particular logical partition until the remaining logical processors have been assigned to the other physical processor chips.

15. The computer program product of claim 14, wherein the computer assigns the remaining logical processors sequentially to the right to higher numbered physical processor chips than the physical processor chip having the greatest logical processor entitlement.

16. The computer program product of claim 15, wherein the computer assigns still remaining logical processors by wrapping around to lower numbered physical processor chips starting with a lowest numbered physical processor chip after filling the higher numbered physical processor chips.

17. The computer program product of claim 14 further comprising:
repeating, by the computer, steps of the assigning for each remaining logical partition of the plurality of active logical partitions; and
dispatching, by the computer, a unit of work to the physical processor chip.

18. The computer program product of claim 14 further comprising:

receiving, by the computer, an input to balance a plurality of logical processors across the plurality of physical processor chips;
selecting, by the computer, the particular logical partition of the plurality of active logical partitions on the computer in response to receiving the input; and
executing, by the particular logical partition, a workload associated with a service provided by the data processing system.

19. The computer program product of claim 14 further comprising:
identifying, by the computer, a particular logical processor entitlement for each respective physical processor chip of the plurality of physical processor chips assigned to the particular logical partition of the plurality of active logical partitions based on the number of logical processors defined for that particular logical partition and a weight of a given logical processor; and
selecting, by the computer, the physical processor chip of the plurality of physical processor chips having the greatest logical processor entitlement for the particular logical partition based on identifying the particular logical processor entitlement for each respective physical processor chip assigned to the particular logical partition.

20. The computer program product of claim 14, wherein each respective logical partition of the plurality of active logical partitions has a different starting chip index to balance distribution of logical processors of multiple over-configured logical partitions.

* * * * *